June 21, 1932. W. B. CONRAD 1,864,123
EYEGLASS ATTACHMENT
Filed May 19, 1930
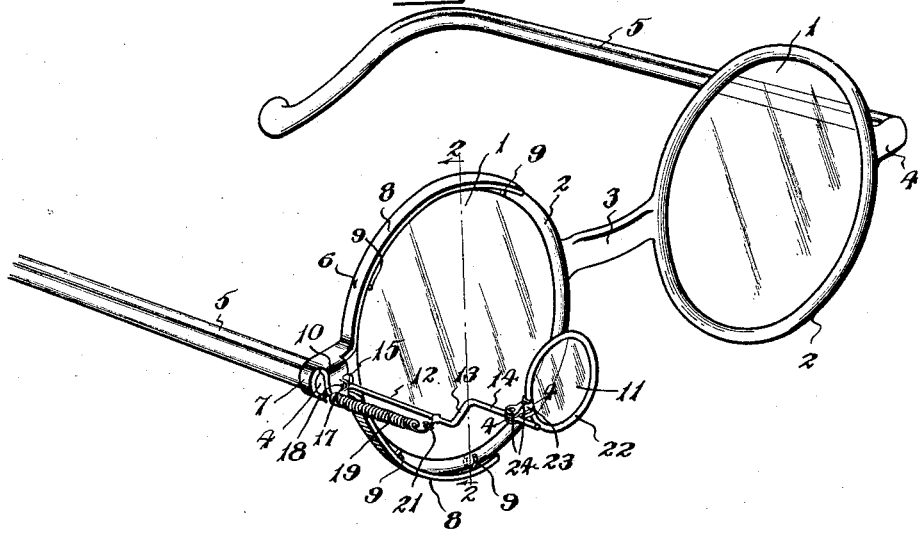
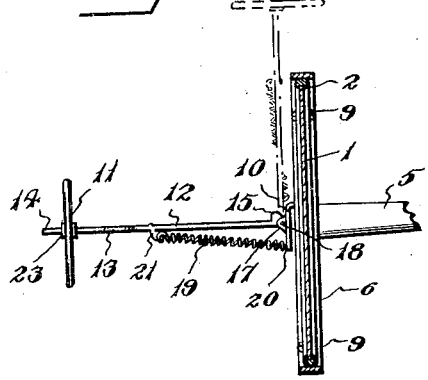
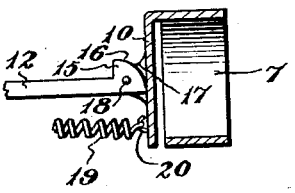
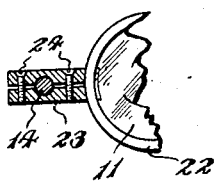
Inventor
W. B. Conrad
By Lacey & Lacey, Attorneys Patented June 21, 1932

1,864,123

UNITED STATES PATENT OFFICE

WILLIAM B. CONRAD, OF CASPER, WYOMING

EYEGLASS ATTACHMENT

Application filed May 19, 1930. Serial No. 453,657.

This invention relates to an eyeglass attachment and more particularly to a magnifying glass and means for connecting the glass with the frame of a pair of spectacles so that the magnifying glass may be swung from an operative position in front of one of the eyeglass lenses to a raised position where it will be out of the way and not interfere with use of the eyeglasses in the usual manner or necessitate removal of the magnifying glass from the eyeglasses when not in use. The device is particularly adapted for use by jewelers and watchmakers but it may be used by engravers or any one who desires to inspect very small objects or intricate work.

One object of the invention is to provide a holder for a magnifying lens or glass which may be very easily applied to a lens-holding rim of a pair of spectacles and will be firmly held in place thereon but may be easily removed when so desired.

Another object of the invention is to so form and mount the lens-carrying arm of the attachment that it may be swung from a raised or inoperative position to a horizontal position when in use and be yieldably retained in either position of adjustment.

Another object of the invention is to so connect the magnifying glass or lens with the supporting arm for the same that the magnifying glass may be disposed in proper focal relation to a lens of the eyeglasses.

The invention is illustrated in the accompanying drawing, wherein

Figure 1 is a perspective view of a pair of spectacles having the improved attachment applied thereto with the magnifying glass of the attachment disposed in an operative position, Fig. 2 is a sectional view taken on the line 2—2 of Figure 1 with the magnifying glass shown in an operative position by full lines and by dotted lines indicating the position assumed by the magnifying glass and its supporting arm when the arm is swung upwardly to an inoperative position.

Fig. 3 is an enlarged fragmentary sectional view.

Fig. 4 is an enlarged view taken on the line 4—4 of Figure 1.

The eyeglasses or spectacles shown in Figure 1 are of a conventional construction and include the usual lenses 1 mounted in rims 2 joined by a bridge or nose piece 3 and having hinge members 4 to which the bows 5 are pivotally connected. It will be understood, however, that the spectacles illustrated merely represent one type of eyeglasses to which the attachment may be applied and that it could be applied with equal facility to spectacles of the rimless type or to nose glasses wherein bows are omitted.

The frame 6 of the attachment consists of a strip of resilient metal bent intermediate its ends to form a U-shaped yoke 7 adapted to engage about one of the hinge members 4 of the eyeglasses and arms 8 which are curved longitudinally in order to fit about one of the rims 2 of the eyeglasses. Clips 9 are secured against the inner faces of the arms or jaws 8 of the attachment frame and these clips are disposed transversely of the arms and engage the eyeglass rim in straddling relation thereto, as clearly shown in Figure 2, so that when the device is applied it will be prevented from slipping out of proper engagement with the eyeglasses. It will be understood that the arms are spread apart when the frame 6 is applied to the eyeglasses and their resiliency causes them to have tight binding engagement with the rim of the glasses. Therefore, the device may be very easily applied to an eyeglass rim with the yoke disposed about one of the hinge members and it will be firmly held in place but can be very easily removed when so desired. One arm of the yoke 7 carries a tongue 10 which extends downwardly in front of the eyeglass hinge, as shown in Figure 1.

In order to support a magnifying glass 11, there has been provided an arm or rod 12 which is bent transversely, as shown at 13, in order to dispose the outer portion 14 of the rod in offset relation to its inner portion. At its inner end the rod is formed with a hinge ear or head 15 having an arcuate edge 16 and this ear is disposed between hinge ears 17 projecting forwardly from the tongue 10 and pivotally mounted by means of a pin 18. By an inspection of Figure 3, it will be seen that due to the shape of the hinge ear 15 the arm or rod 12 may be swung from the raised or inoperative position indicated by dotted lines in Figure 2 to a lowered or operative position but will be prevented from moving downwardly beyond a horizontal position by engagement of the rear end of the hinge ear with the tongue 10. A coiled spring 19 extends longitudinally of the rod 12 and has one end engaged with a hook 20 carried by the tongue 10 and its other end engaged with a hook 21 fixed upon the rod rearwardly of the bent portion 13. This spring is expanded and placed under tension when engaged with the hooks 20 and 21 and serves to retain the rod in either position of adjustment while at the same time permitting it to be easily moved from one position to the other.

The magnifying glass or lens 11 is provided with a rim 22 and this rim carries a clamp 23 which is rigidly fixed to the rim of the magnifying glass and has its jaws formed with opposed recesses to receive the outer portion 14 of the arm or rod 12. Adjusting screws 24 are engaged through the jaws of the clamp, as shown in Figure 4, and by loosening these screws the magnifying glass may be moved longitudinally or circumferentially upon the supporting rod until it is in the proper position relative to the eyeglass lens and the screws then tightened to securely hold the magnifying glass in a set position. Therefore, the magnifying glass may be adjusted and disposed in proper spaced and focal relation to the lens of any pair of eyeglasses to which the device is applied.

When the device is in use, the arms or jaws 8 are engaged about the rim of one lens of a pair of eyeglasses or about the eyeglass lens itself with the yoke 7 extending outwardly from the eyeglass lens and engaged about the hinge 4 to which one of the bows 5 is attached. The magnifying glass is properly adjusted upon the outer portion 14 of the rod so that when the rod is moved downwardly to a lowered position the magnifying glass will be disposed in front of the eyeglass lens in such relation thereto that a person wearing the eyeglasses may look through the magnifying glass while repairing a watch or during other work in which it is necessary to have the object worked upon magnified in order that it may be seen clearly. When use of the magnifying glass is not necessary, the arm or rod is swung upwardly to the position indicated by dotted lines in Figure 2 where it will be out of the way and not interfere with normal use of the eyeglasses.

Having thus described the invention, I claim:

1. A lens-holding attachment for eyeglasses comprising a frame having jaws to engage about an eyeglass, and a yoke connecting the jaws adapted to engage a hinge at the outer side of an eyeglass, an arm carried by the yoke of said frame and movable from an extended position in front of the frame to a retracted position, means to retain the arm in a set position, and a magnifying lens carried by said arm.

2. A lens-holding attachment for eyeglasses comprising a resilient frame adapted to fit over one of the side hinges of an eyeglass and provided with spring jaws adapted to clamp around the rim thereof, an arm pivoted to said frame for swinging movement from an extended position in front of the frame to a raised position, means to limit movement of said arm, means to yieldably resist movement of the arm, and a magnifying lens carried by said arm.

3. A lens-holding attachment for eyeglasses comprising a resilient frame adapted to fit over one side hinge of an eyeglass and provided with oppositely disposed spring jaws adapted to clamp around the rim thereof, an arm pivoted to said frame for swinging movement from an extended position in front of the frame to a retracted position, the inner pivoted end of the arm being formed with abutment portions adapted to contact with the frame to limit swinging movement of the arm, a spring engaged with the arm and frame and yieldably resisting movement of the arm from one adjusted position to the other, and a magnifying lens carried by said arm and disposed in front of an eyeglass lens arm and disposed in front of an eyeglass lens substantially parallel thereto when the arm is swung to an extended position.

4. A lens-holding attachment for eyeglasses comprising a mounting adapted to be connected with an eyeglass, an arm pivoted to said mounting for swinging movement from an extended position in front of the frame to a retracted position, said arm being bent transversely in spaced relation to its outer end to dispose the outer portion of the arm in offset relation to the main portion of the arm, a magnifying lens slidable along the outer portion of said arm and movable about the same whereby it may be disposed in determined relation to an eyeglass lens when the arm is in an extended position, and means to releasably secure the magnifying lens in a set position upon the arm.

5. A lens-holding attachment for eyeglasses comprising a frame formed of resilient material and having jaws to engage about an eyeglass and a yoke connecting the jaws and adapted to fit about a hinge at the outer side of the eyeglass, an arm pivoted to the yoke of said frame for movement from a retracted position to an extended position in front of the frame, and a magnifying lens carried by said arm and disposed in front of an eyeglass lens when the arm is in its extended position.

6. A lens-holding attachment for eyeglasses comprising a frame formed of resilient material and having jaws to engage about an eyeglass and a yoke connecting the jaws and adapted to fit about a hinge at the outer side of the eyeglass, a tongue carried by the yoke and disposed in front of the eyeglass hinge, an arm pivoted to said tongue for swinging movement from a retracted position to an extended substantially horizontal position in front of the tongue, and a magnifying lens carried by said arm and disposed in front of an eyeglass lens when the arm is in its extended position.

In testimony whereof I affix my signature.

WILLIAM B. CONRAD. [L. S.]